US012206516B2

(12) United States Patent
Sipcic et al.

(10) Patent No.: US 12,206,516 B2
(45) Date of Patent: Jan. 21, 2025

(54) NETWORK BANDWIDTH CONSERVATION DURING VIDEO CONFERENCING

(71) Applicant: INTERNATIONAL BUSINESS MACHINES CORPORATION, Armonk, NY (US)

(72) Inventors: Slobodan Sipcic, Bethesda, MD (US); Peeyush Jaiswal, Boca Raton, FL (US); Priyansh Jaiswal, Boca Raton, FL (US); Paul Llamas Virgen, Zapopan (MX); Victor Povar, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 17/446,528

(22) Filed: Aug. 31, 2021

(65) Prior Publication Data

US 2023/0065847 A1  Mar. 2, 2023

(51) Int. Cl.
*H04L 12/18* (2006.01)
*G06F 3/01* (2006.01)
*G06F 3/16* (2006.01)

(52) U.S. Cl.
CPC .......... *H04L 12/1827* (2013.01); *G06F 3/013* (2013.01); *G06F 3/167* (2013.01); *H04L 12/1822* (2013.01)

(58) Field of Classification Search
CPC . H04L 12/1827; H04L 12/1822; G06F 3/013; G06F 3/167; G06F 2203/0381; H04N 7/147; H04N 7/152
USPC ................................. 709/204–207, 227–229
See application file for complete search history.

(56) References Cited

U.S. PATENT DOCUMENTS

| 5,745,161 | A | * | 4/1998 | Ito | H04N 7/15 |
|   |   |   |   |   | 348/E7.083 |
| 5,959,667 | A |   | 9/1999 | Maeng |   |
| 6,795,806 | B1 | * | 9/2004 | Lewis | G06F 3/167 |
|   |   |   |   |   | 704/E15.044 |
| 8,320,971 | B2 |   | 11/2012 | Roberts |   |

(Continued)

FOREIGN PATENT DOCUMENTS

| CN | 107613368 A | * | 1/2018 | ........... H04N 21/433 |
| WO | WO-2019071808 A1 | * | 4/2019 | ......... H04N 21/4788 |

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Abdulkader M Alriyashi
(74) *Attorney, Agent, or Firm* — Anthony M. Pallone

(57) ABSTRACT

According to one embodiment, a method, computer system, and computer program product for network bandwidth conservation is provided. The embodiment may include monitoring eye focus of a user. The embodiment may include monitoring voice input of the user. In response to determining the eye focus of the user is on a video feed of another user for more than a threshold amount of focus time, the embodiment may include receiving the video feed of the another user. In response to determining the eye focus of the user is on a screen of a video conference and determining, based on the voice input, the user is speaking towards the screen of the video conference, the embodiment may include enabling a camera of the user and transmitting a video feed of the user.

15 Claims, 6 Drawing Sheets

(56) References Cited

U.S. PATENT DOCUMENTS

| | | | |
|---|---|---|---|
| 9,100,540 B1* | 8/2015 | Gates | H04N 7/15 |
| 9,125,138 B2 | 9/2015 | Abuan | |
| 9,137,486 B2 | 9/2015 | Wu | |
| 9,467,653 B2 | 10/2016 | Bentley | |
| 10,089,121 B2 | 10/2018 | Dobryniewski | |
| 10,515,117 B2 | 12/2019 | Storer | |
| 2003/0052911 A1 | 3/2003 | Cohen-solal | |
| 2005/0190257 A1 | 9/2005 | Kenoyer | |
| 2007/0005752 A1 | 1/2007 | Chawla | |
| 2008/0267282 A1* | 10/2008 | Kalipatnapu | H04L 12/1822 348/E7.084 |
| 2014/0003450 A1* | 1/2014 | Bentley | H04N 7/15 370/468 |
| 2014/0351327 A1 | 11/2014 | Huang | |
| 2017/0171261 A1* | 6/2017 | Smus | G06V 40/197 |
| 2017/0344106 A1* | 11/2017 | Cohen | G06F 3/013 |

OTHER PUBLICATIONS

Tang et al., "Why do users like video? Studies of Multimedia-Supported Collaboration." Computer Supported Cooperative Work (CSCW) 1.3, Sep. 1992, 29 pages.

\* cited by examiner

NETWORK BANDWIDTH CONSERVATION DURING VIDEO CONFERENCING

BACKGROUND

The present invention relates generally to the field of computing, and more particularly to online video conferencing.

Video conferencing refers to conducting a video conference or video teleconference in which two or more sets of hardware and software interact while simultaneously transmitting and receiving video and audio signals from two or more geographic locations. There are a variety of ways video conferencing may be conducted through a variety of desktop and mobile collaborative meeting applications, as well as collaborative meeting browser extensions. For example, individuals may use web cameras connected to or built into laptops, tablets, or desktop computers. Smartphones and other connected mobile devices equipped with cameras may also be used to connect for video conferences. In such instances, a software-based platform typically is used to transmit the communication over Internet protocols such as Transmission Control Protocol and the Internet Protocol (TCP/IP). Video conferencing has become an effective interaction and communication tool that enables both small and large-scale companies to reduce travel and operational costs incurred in conducting in-person meetings. As such, demand for remote workforce management using these collaborative meeting applications has increased steadily in recent years.

SUMMARY

According to one embodiment, a method, computer system, and computer program product for network bandwidth conservation is provided. The embodiment may include monitoring eye focus of a user. The embodiment may include monitoring voice input of the user. In response to determining the eye focus of the user is on a video feed of another user for more than a threshold amount of focus time, the embodiment may include receiving the video feed of the another user. In response to determining the eye focus of the user is on a screen of a video conference and determining, based on the voice input, the user is speaking towards the screen of the video conference, the embodiment may include enabling a camera of the user and transmitting a video feed of the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
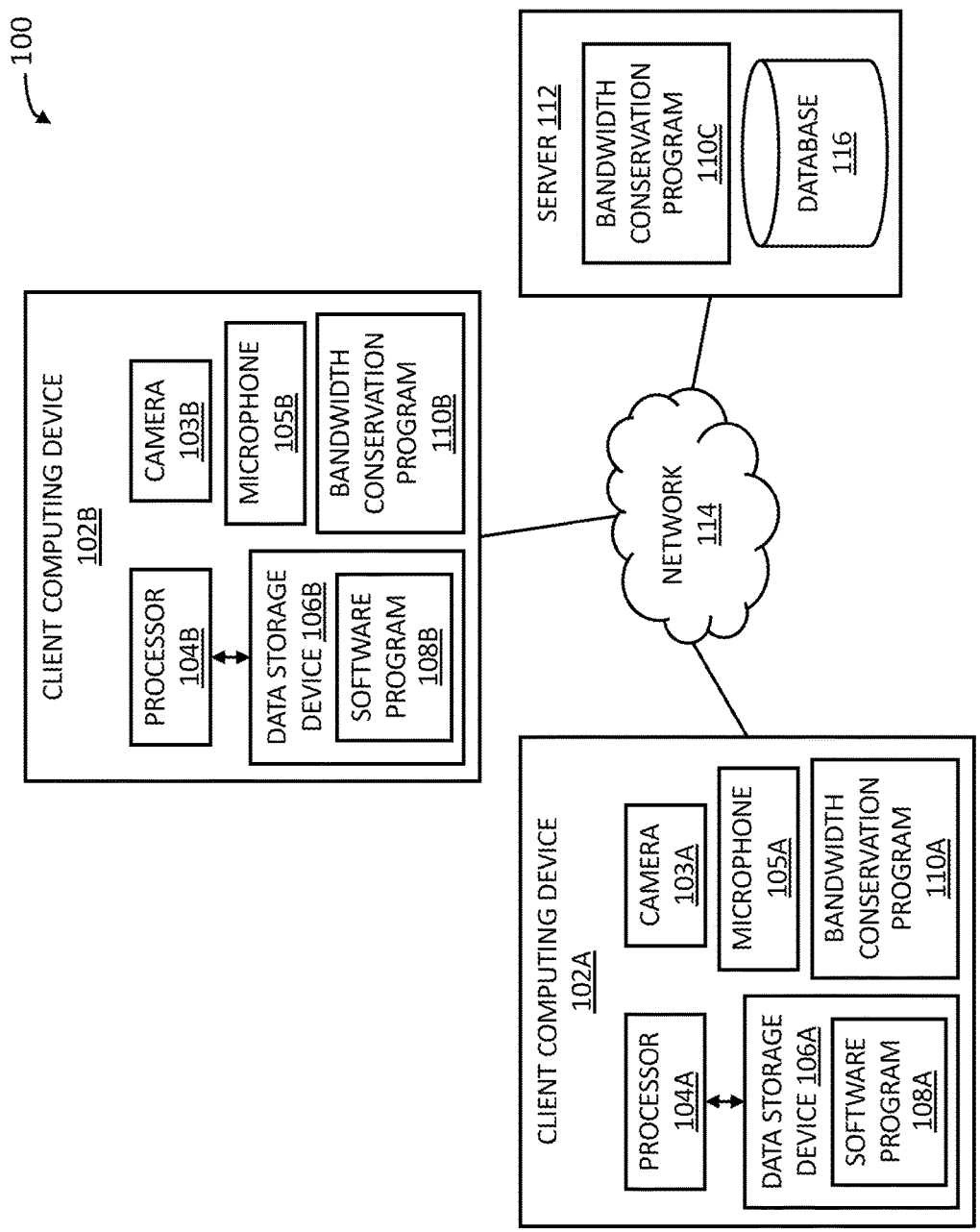
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to online video conferencing. The following described exemplary embodiments provide a system, method, and program product to, among other things, dynamically limit a user's ability to send or receive streaming video during an online video conference based on an analysis of the user's attention. Therefore, the present embodiment has the capacity to improve the technical field of online video conferencing by providing a system to conserve network bandwidth through selective video capturing and streaming during a web conference based on analyzing a sending user's intention to capture and transmit their video stream to other users and analyzing whether a receiving user's attention (e.g., eye focus) warrants receiving and rendering a transmitted video stream.

As previously described, video conferencing refers to conducting a video conference or video teleconference in which two or more sets of hardware and software interact while simultaneously transmitting and receiving video and audio signals from two or more geographic locations. There are a variety of ways video conferencing may be conducted through a variety of desktop and mobile devices and collaborative meeting applications, as well as collaborative meeting browser extensions. For example, individuals may use web cameras connected to or built into laptops, tablets, or desktop computers. Smartphones and other connected mobile devices equipped with cameras may also be used to connect for video conferences. In such instances, a software-based platform typically is used to transmit the communication over Internet protocols such as TCP/IP. Video conferencing has become an effective interaction and communication tool that enables both small and large-scale companies to reduce travel and operational costs incurred in conducting in-person meetings.

In corporate settings, video conferencing technologies may be used for cost-effective, real-time, and long-distance communication and for augmenting the productivity of various teams based in multiple geographic locations. As such, demand for remote workforce management using video conferencing has increased steadily in recent years. However, as virtual conferences increasingly become a day-to-day occurrence, there are a plurality of influencing factors that may cause poor functioning of video conferencing tools and decrease the quality and effectiveness of a video conference. One such factor of significant influence may be the availability of network bandwidth (i.e., the maximum rate of data transfer across a network path) sufficient to support the demands of a video conference. Streaming video during a video conference may be among the most demanding services in terms of network bandwidth, as a video stream requires a large amount of data to be transmitted/received. The stability and quality of the video conference may fluctuate with the speed and reliability of the data connection, especially where video streams of multiple conference participants are involved. Although the ability of participants to stream video may be restricted by a conference host or the participants themselves, such a restriction must be manually performed. Therefore, it may be advantageous to, among other things, minimize demands on available network bandwidth during a video conference by dynamically restricting a participant's ability to stream video during the conference based on an attention analysis of the participant.

According to at least one embodiment, a user (i.e., a video conference participant) may receive a video stream of another user (i.e., another video conference participant) if it is determined that the user is actively looking at the video stream of the other user. According to at least one embodiment, a camera of a user may be activated, and video of the user may be streamed to other users based on analysis of voice input and eye focus of the user. Only when eye focus of the user is directly on a screen of the video conference while the user is talking, may the camera of the user be continuously activated and streaming video to other users. At all other times, the camera of the user may be disabled. During a time when the camera of the user is activated, still images of the user may be captured. The still images of the user may be transmitted periodically to the other users when the camera of the user is not continuously activated and streaming video to the other users.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to dynamically limit a user's ability to send or receive streaming video during an online video conference.

Referring to FIG. 1, an exemplary networked computer environment 100 is depicted, according to at least one embodiment. The networked computer environment 100 may include client computing device 102A, 102B and a server 112 interconnected via a communication network 114. According to at least one implementation, the networked computer environment 100 may include a plurality of client computing devices 102A, 102B and servers 112, of which only one of each is shown for illustrative brevity. Additionally, in one or more embodiments, the client computing device 102A, 102B and server 112 may each individually host a bandwidth conservation program 110A, 110B, 110C. In one or more other embodiments, the bandwidth conservation program 110A, 110B, 110C may be partially hosted on client computing device 102A, 102B and server 112 so that functionality may be separated between the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing devices 102A, 102B may include a camera 103A, 103B, a processor 104A, 104B and a data storage device 106A, 106B, respectively, that is enabled to host and run a software program 108A, 108B and a bandwidth conservation program 110A, 110B, respectively, and communicate with each other and with the server 112 via the communication network 114, in accordance with one embodiment of the invention. In one or more embodiments, client computing devices 102A, 102B may be, for example, a mobile device, a smartphone, a personal digital assistant, a netbook, a laptop computer, a tablet computer, a desktop computer, or any type of computing device having a camera and a microphone and capable of running a program and accessing a network. The camera 103A, 103B may be embedded in or external to the client computing devices 102A, 102B and may be capable of detecting eye movement and capturing images and video. The microphone 105A, 105B may be embedded in or external to the client computing devices 102A, 102B and may be capable of capturing audio output of a user. As will be discussed with reference to FIG. 4, the client computing device 102A, 102B may include internal components 402a, 402b and external components 404a, 404b, respectively.

The server computer 112 may be a laptop computer, netbook computer, personal computer (PC), a desktop computer, or any programmable electronic device or any network of programmable electronic devices capable of hosting and running a bandwidth conservation program 110C and a database 116 and communicating with the client computing device 102A, 102B via the communication network 114, in accordance with embodiments of the invention. In at least one embodiment, the dynamic seating arrangement program 110B may be a centralized management system for a seating space. As will be discussed with reference to FIG. 4, the server computer 112 may include internal components 402c and external components 404c, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the bandwidth conservation program 110A, 110B, 110C may be capable of analyzing a user's voice input and eye focus when participating in an online video conference and determining an attention status of the user. In response to determining the attention status of the user, the bandwidth conservation program 110A, 110B, 110C may dynamically restrict the user's ability to stream video during the online video conference. The bandwidth conservation program 110A, 110B, 110C may be integrated within or utilized in conjunction with a collaborative meeting application for online video conferencing. The network bandwidth conservation method is explained in further detail below with respect to FIG. 2 and FIG. 3.

Figure 2:
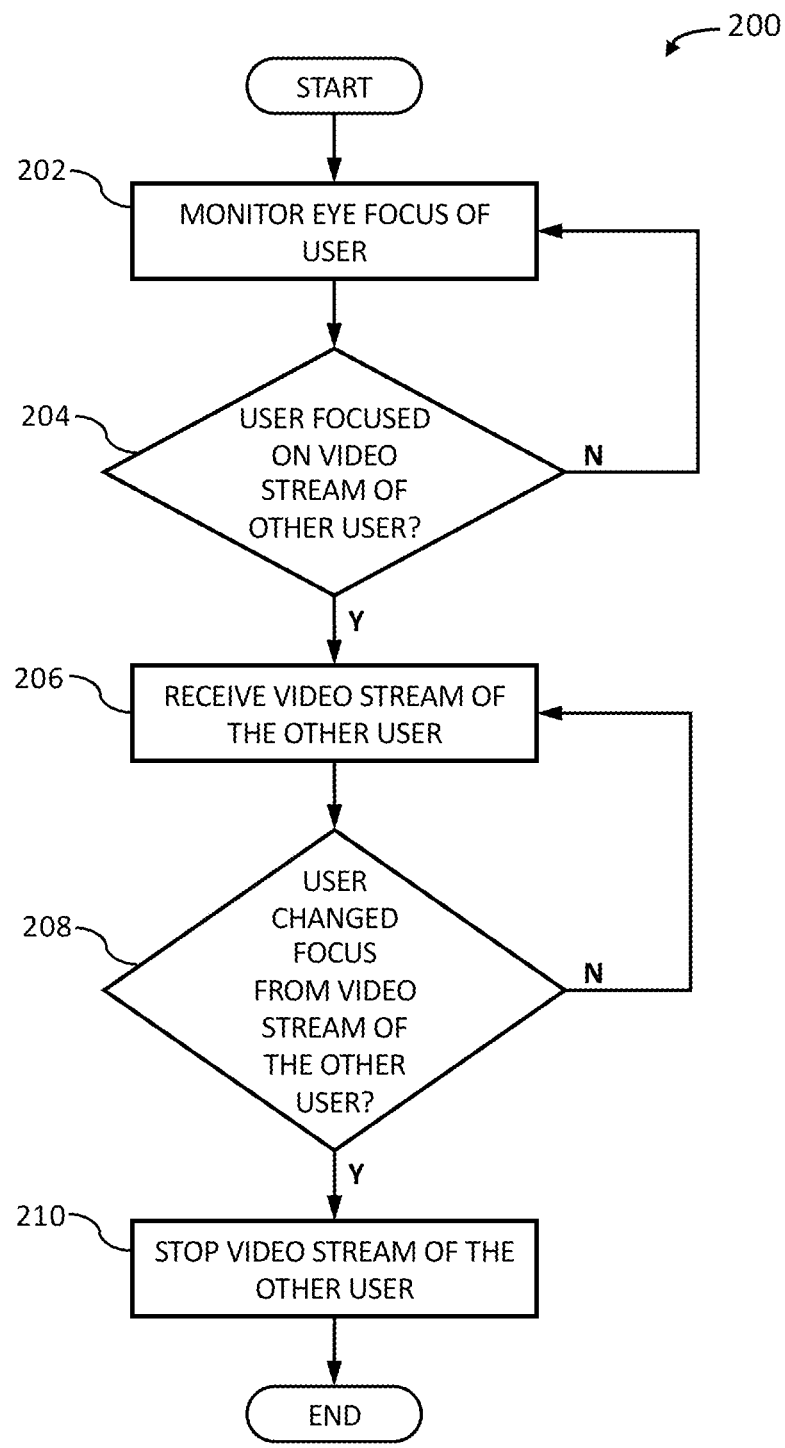
FIG. 2 illustrates an operational flowchart of a video stream reception capability process according to at least one embodiment.

Referring now to FIG. 2, an operational flowchart for determining a capability of receiving a video stream in a video stream reception capability process 200 is depicted according to at least one embodiment. At 202, the bandwidth conservation program 110A, 110B, 110C may monitor eye focus of a user participating in an online video conference. The bandwidth conservation program 110A, 110B, 110C may be integrated within or utilized in conjunction with a collaborative meeting application (e.g., software program 108A) hosting the online video conference and being accessed by the user via client computing device 102A. The bandwidth conservation program 110A, 110B, 110C may track, via camera 103A, eye movement of the user and process the tracked eye movement as input to perform eye tracking analysis of the user. In performing the eye tracking analysis of the user, the bandwidth conservation program 110A, 110B, 110C may identify one or more focus areas (i.e., interest zones) of the user based on their tracked eye movement. The identified focus areas may represent different portions of a screen of the client computing device 102A which the user has viewed for more than a threshold amount of focus time (e.g., two seconds). Moreover, the bandwidth conservation program 110A, 110B, 110C may determine a center of an identified focus area, based on an approximate mapping of the user's gaze to a point on the screen, and the bounds of the focus area may be determined by a k-distance radius from the center. The k-distance may be a pre-defined value set by the user.

According to at least one embodiment, the threshold amount of focus time may be initially pre-defined by the user. However, the bandwidth conservation program 110A, 110B, 110C may change the threshold amount of focus time based on learned patterns of user eye focus. For example, in a training phase, the bandwidth conservation program 110A, 110B, 110C may observe user eye focus behavior and apply artificial intelligence (AI) enabled methods of historical analysis on observed user eye focus behavior, which may include an average amount of time the user spends looking at a video feed of another user, an average amount of time the user spends looking at video conference related content (e.g., presentations, graphics, documents), and an average amount of time the user looks away (i.e., changes focus) from a video feed before returning gaze back to the video feed, to learn patterns of user eye focus. The bandwidth conservation program 110A, 110B, 110C may adapt the threshold amount of focus time accordingly. Additionally, in the training phase, the bandwidth conservation program 110A, 110B, 110C may also observe, via the microphone 105A and the camera 103A, user speech behaviors and user activities when participating in a video conference. Speech behaviors may include words, phrases, and sounds voiced by the user before speaking to other conference participants. User activities may include interactions of the user with objects (e.g., glasses, cups, phone, writing instruments) in view of the camera 103A during a video conference. The bandwidth conservation program 110A, 110B, 110C may apply AI methods of machine learning and classification to learn patterns of user speech and user activity which are predictive of a user's intent to speak to participants of a video conference, and predictive of a user's attention after performing an activity. Learned patterns of user eye focus behavior, user speech, and user activity may be stored within the data storage device 106A or the database 116 and may be utilized by the bandwidth conservation program 110A, 110B, 110C, in an implementation phase, as factors in determining a user's ability to receive or transmit a video stream during an online video conference.

Next, at 204, the bandwidth conservation program 110A, 110B, 110C may determine whether the user is focused on a video feed from another user participating in the online video conference (e.g., a user of client computing device 102B). A video feed focus flag may be set to true for the user when his or her eyes are focused on a video feed from another user within a current focus area (i.e., an identified focus area which the user is currently viewing) for more than the threshold amount of focus time, even if the video feed is blank. In determining whether the user is focused on a video feed from another user, the bandwidth conservation program 110A, 110B, 110C may perform a screen analysis to compare objects/content displayed within identified focus areas and identify those focus areas which are displaying objects/content related to the video conference. The bandwidth conservation program 110A, 110B, 110C may correlate its eye tracking analysis with its screen analysis to verify that the current focus area of the user is displaying content of the video conference (e.g., the video feed from another user). In response to determining the user is not focused on a video feed from another user and the video feed focus flag is set to false (step 204, "No" branch), the video stream reception capability process 200 may return to step 202 to continue to monitor the eye focus of the user. In response to determining the user is focused on a video feed from another user and the video feed focus flag is set to true (step 204, "Yes" branch), the video stream reception capability process 200 may proceed to step 206.

According to another embodiment, in performing the screen analysis, the bandwidth conservation program 110A, 110B, 110C may also compare objects/content of active windows displayed within the screen of the client computing device 102A and identify those active windows which are displaying objects/content related to the video conference. The bandwidth conservation program 110A, 110B, 110C may correlate its eye tracking analysis with its screen analysis to verify that the current focus area of the user includes an active window displaying objects/content related to the video conference.

At 206, in response to determining that the user is focused on a video feed from another user and that the video feed focus flag is set to true, the bandwidth conservation program 110A, 110B, 110C may allow the user to receive, and thus view, the video stream of the other user via the client computing device 102A. Otherwise, the bandwidth conservation program 110A, 110B, 110C may not allow the user to stream the video feed of the other user. According to another embodiment, in addition to receiving the video stream of the other user, the bandwidth conservation program 110A, 110B, 110C may also allow the user to receive, and thus view, the video streams of other video conference participants which are within the current focus area of the user. For example, the user may receive the video stream of the other user as well as the video streams immediately adjacent to the video stream of the other user.

Then, at 208, the bandwidth conservation program 110A, 110B, 110C may determine whether the user has changed eye focus from the video feed of the other user. The bandwidth conservation program 110A, 110B, 110C may continuously track eye movement of the user to determine if the user has changed their gaze from the video feed of the other user for more than the threshold amount of focus time. In response to determining the user has not changed eye focus from the video feed of the other user for more than the threshold amount of focus time (step 208, "No" branch), the video stream reception capability process 200 may return to step 206 to continue to receive the video stream of the other user. In response to determining the user has changed eye focus from the video feed of the other user for more than the threshold amount of focus time (step 208, "Yes" branch), the video stream reception capability process 200 may proceed to step 210.

At 210, in response to determining that the user has not looked at the video feed of the other user for more than the threshold amount of focus time, bandwidth conservation program 110A, 110B, 110C may terminate reception of the video stream of the other user and thus prevent the user from viewing the video feed of the other user via the client computing device 102A. The above steps of video stream reception capability process 200 may be applied to each video stream the user receives from other users participating in the online video conference.

Figure 3:
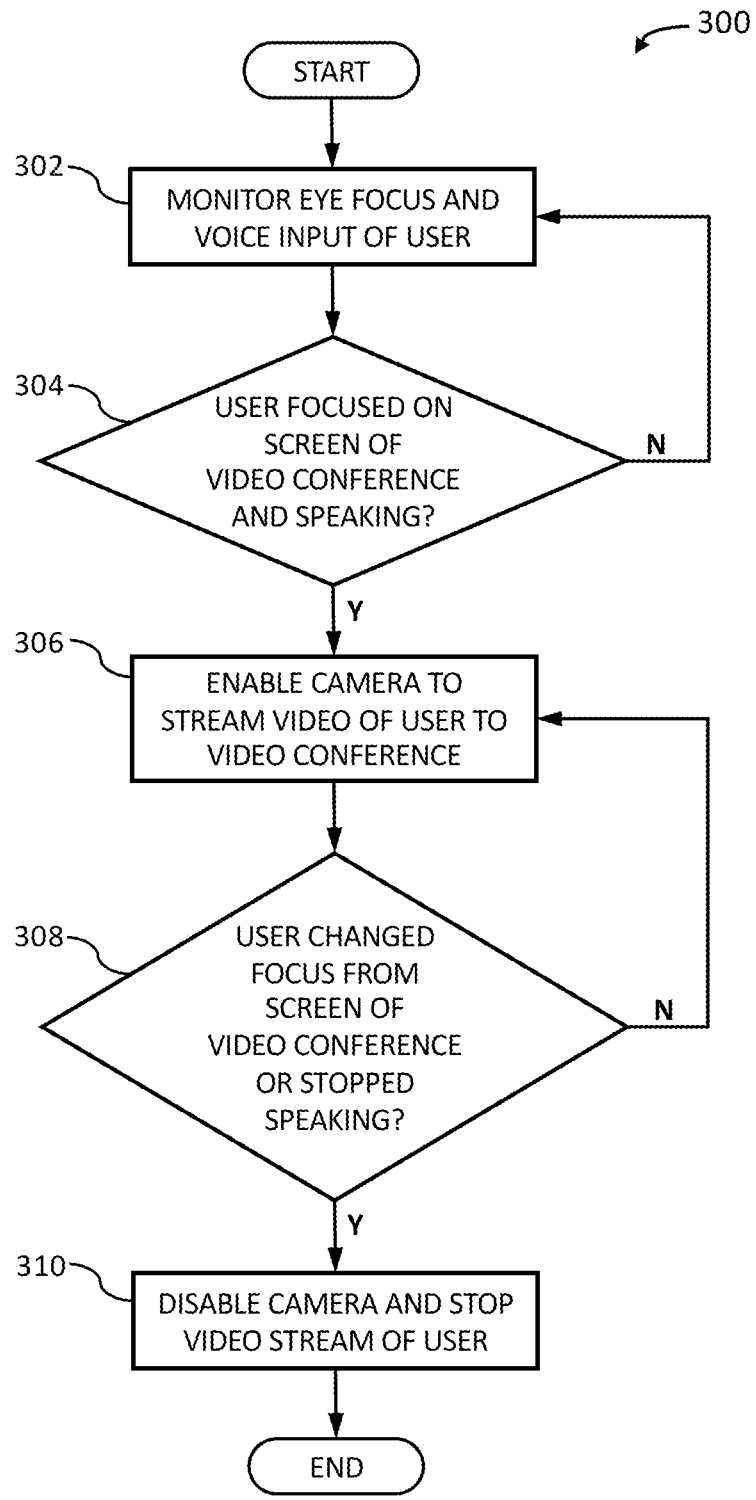
FIG. 3 illustrates an operational flowchart of a video stream transmission capability process according to at least one embodiment.

Referring now to FIG. 3, an operational flowchart for determining a capability of transmitting a video stream in a video stream transmission capability process 300 is depicted according to at least one embodiment. At 302, the bandwidth conservation program 110A, 110B, 110C may monitor eye focus and voice input of a user participating in an online video conference. The bandwidth conservation program 110A, 110B, 110C may be integrated within or utilized in conjunction with a collaborative meeting application (e.g., software program 108B) hosting the online video conference and being accessed by the user via client computing device 102B. The bandwidth conservation program 110A, 110B, 110C may track, via camera 103B, eye movement of the user and process the tracked eye movement as input to perform eye tracking analysis of the user, as described above. Furthermore, the bandwidth conservation program 110A, 110B, 110C may receive audio of the user, captured via microphone 105B, and analyze the received audio to determine if the user intends to speak to other conference participants (e.g., a user of client computing device 102A). In analyzing the received user audio, the bandwidth conservation program 110A, 110B, 110C, may apply natural language processing (NLP) techniques to identify learned patterns of user speech (e.g., words, word phrases, sounds) typically voiced by the user before speaking to other conference participants.

Then, at 304, the bandwidth conservation program 110A, 110B, 110C may determine whether the user is focused on a screen of the online video conference while speaking at the same time. A conference screen focus flag may be set to true for the user when his or her eyes are focused on a screen, or screens, where the video conference is being displayed. The bandwidth conservation program 110A, 110B, 110C may perform screen analysis, as described above, to identify a screen, or screens, of the online video conference. Additionally, a voice detection flag may be set to true for the user when his or her voice is detected to be speaking towards the screen, or screens, of the video conference. In response to determining that the conference screen focus flag is set to false (i.e., the user is not focused on a screen of the video conference), or that the voice detection flag is set to false (i.e., the user is not speaking towards a screen of the video conference), the video stream transmission capability process 300 may return (step 304, "No" branch) to step 302 to continue to monitor the eye focus and voice input of the user. In response to determining that the conference screen focus flag is set to true (i.e., the user is focused on a screen of the video conference), and the voice detection flag is set to true (i.e., the user is speaking towards a screen of the video conference), the video stream transmission capability process 300 may proceed (step 304, "Yes" branch) to step 306.

At 306, in response to determining that both the conference screen focus flag is set to true and the voice detection flag is set to true, the bandwidth conservation program 110A, 110B, 110C may enable the camera 103B to continuously capture real-time video of the user and stream the real-time video of the user to the other video conference participants (e.g., a user of client computing device 102A). Only when both flags are set to true (i.e., the user is focused on a screen of the video conference and speaking towards the screen at the same time) may the user have the ability to transmit their video stream to other participants of the online video conference. Otherwise, the bandwidth conservation program 110A, 110B, 110C may disable the user's ability to stream his or her video feed to other users. Additionally, while the camera 103B is enabled to capture and stream real-time video of the user, the bandwidth conservation program 110A, 110B, 110C may capture, via the camera 103B, one or more still images of the user in an engaged state (i.e., a state in which the user is talking and looking at a screen of the video conference). The captured still images of the user may be stored within the data storage device 106B or the database 116.

Then, at 308, the bandwidth conservation program 110A, 110B, 110C may determine whether the user has changed eye focus from a screen of the video conference or has stopped speaking towards a screen of the video conference. The bandwidth conservation program 110A, 110B, 110C may continuously track eye movement of the user to determine if the user has changed their gaze from a screen of the video conference, as well as continuously monitor audio of the user to determine if the user is speaking. In response to determining that the user has not changed eye focus from a screen of the video conference), and that the user is still speaking towards a screen of the video conference, the video stream transmission capability process 300 may return (step 308, "No" branch) to step 306 to continue to capture real-time video of the user and stream the real-time video of the user to the other conference participants. In response to determining that the user has changed eye focus from a screen of the video conference), or that the user has stopped speaking towards a screen of the video conference, the video stream transmission capability process 300 may proceed (step 308, "Yes" branch) to step 310.

At 310, in response to determining that the user has either stopped looking at a screen of the video conference or has stopped speaking, the network bandwidth conservation program 110A, 110B, 110C may prevent the camera 103B from continuously capturing real-time video of the user and prevent streaming of real-time video of the user to the other conference participants. In lieu of streaming the user's real-time video to other video conference participants, the network bandwidth conservation program 110A, 110B, 110C may periodically transmit one or more still images of the user, captured at step 306, to the other video conference participants (e.g., a user of client computing device 102A) so that they may see relatively recent pictures of the user whose video stream has been disabled.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
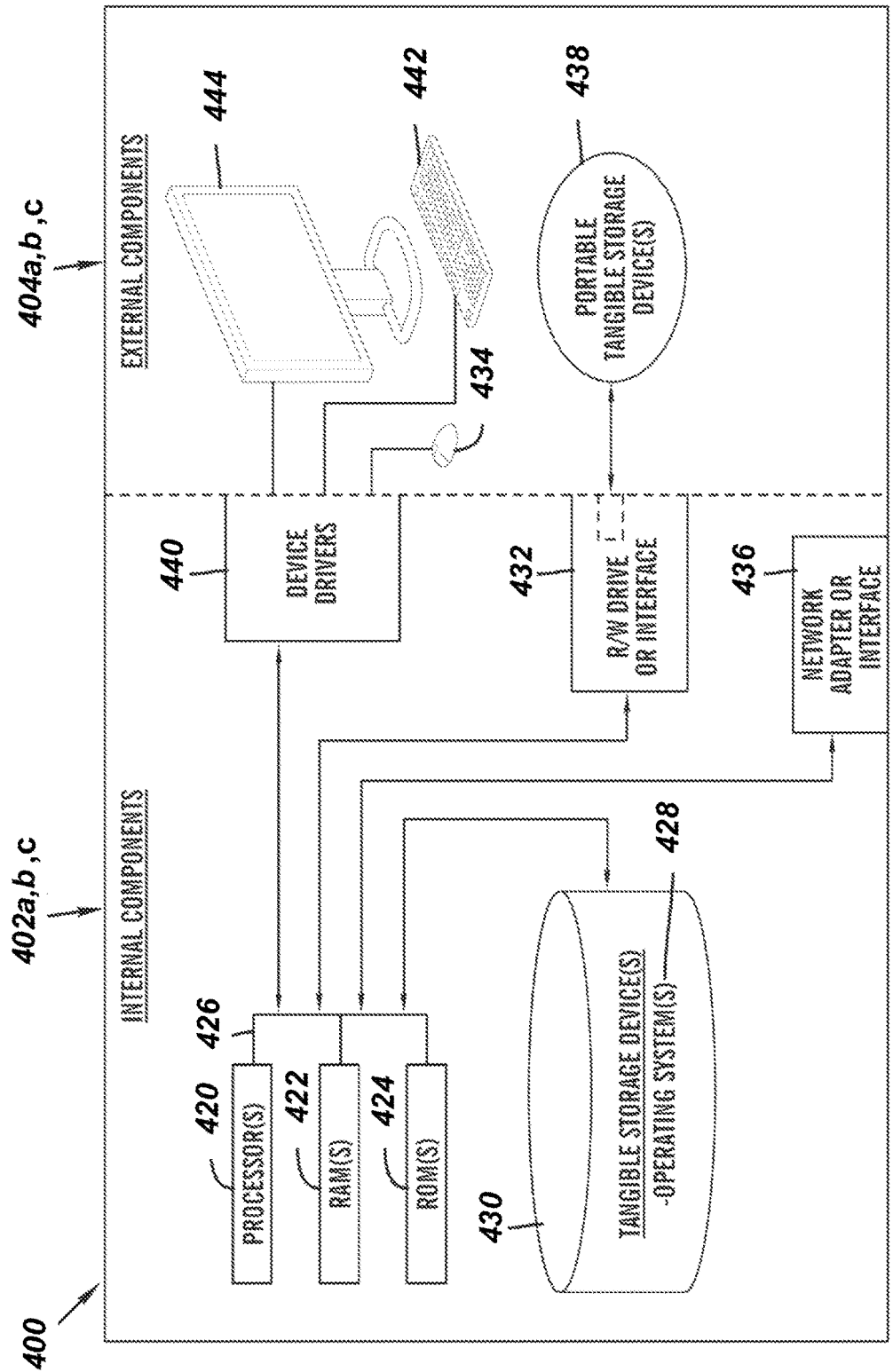
FIG. 4 is a block diagram of internal and external components of computers and servers depicted in FIG. 1 according to at least one embodiment.

FIG. 4 is a block diagram 400 of internal and external components of the client computing devices 102A, 102B, and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing devices 102A, 102B, and the server 112 may include respective sets of internal components 402 a,b,c and external components 404 a,b,c illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108A and the network bandwidth conservation program 110A in the client computing device 102A, the software program 108B and the network bandwidth conservation program 110B in the client computing device 102B, and the network bandwidth conservation program 110C in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b,c also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the network bandwidth conservation program 110A, 110B, 110C, can be stored on one or more of the respective portable computer-readable tangible storage devices 438, read via the respective R/W drive or interface 432, and loaded into the respective hard drive 430.

Each set of internal components 402 a,b,c also includes network adapters or interfaces 436 such as a TCP/IP adapter cards, wireless Wi-Fi interface cards, or 3G or 4G wireless interface cards or other wired or wireless communication links. The software program 108A and the network bandwidth conservation program 110A in the client computing device 102A, the software program 108B and the network bandwidth conservation program 110B, and the network bandwidth conservation program 110C in the server 112 can be downloaded to the client computing devices 102A, 102B, and the server 112 from an external computer via a network (for example, the Internet, a local area network or other, wide area network) and respective network adapters or interfaces 436. From the network adapters or interfaces 436, the software program 108A and the network bandwidth conservation program 110A in the client computing device 102A, the software program 108B and the network bandwidth conservation program 110B in the client computing device 102B, and the network bandwidth conservation program 110C in the server 112 are loaded into the respective hard drive 430. The network may comprise copper wires, optical fibers, wireless transmission, routers, firewalls, switches, gateway computers and/or edge servers.

Each of the sets of external components 404 a,b,c can include a computer display monitor 444, a keyboard 442, and a computer mouse 434. External components 404 a,b,c can also include touch screens, virtual keyboards, touch pads, pointing devices, and other human interface devices. Each of the sets of internal components 402 a,b,c also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
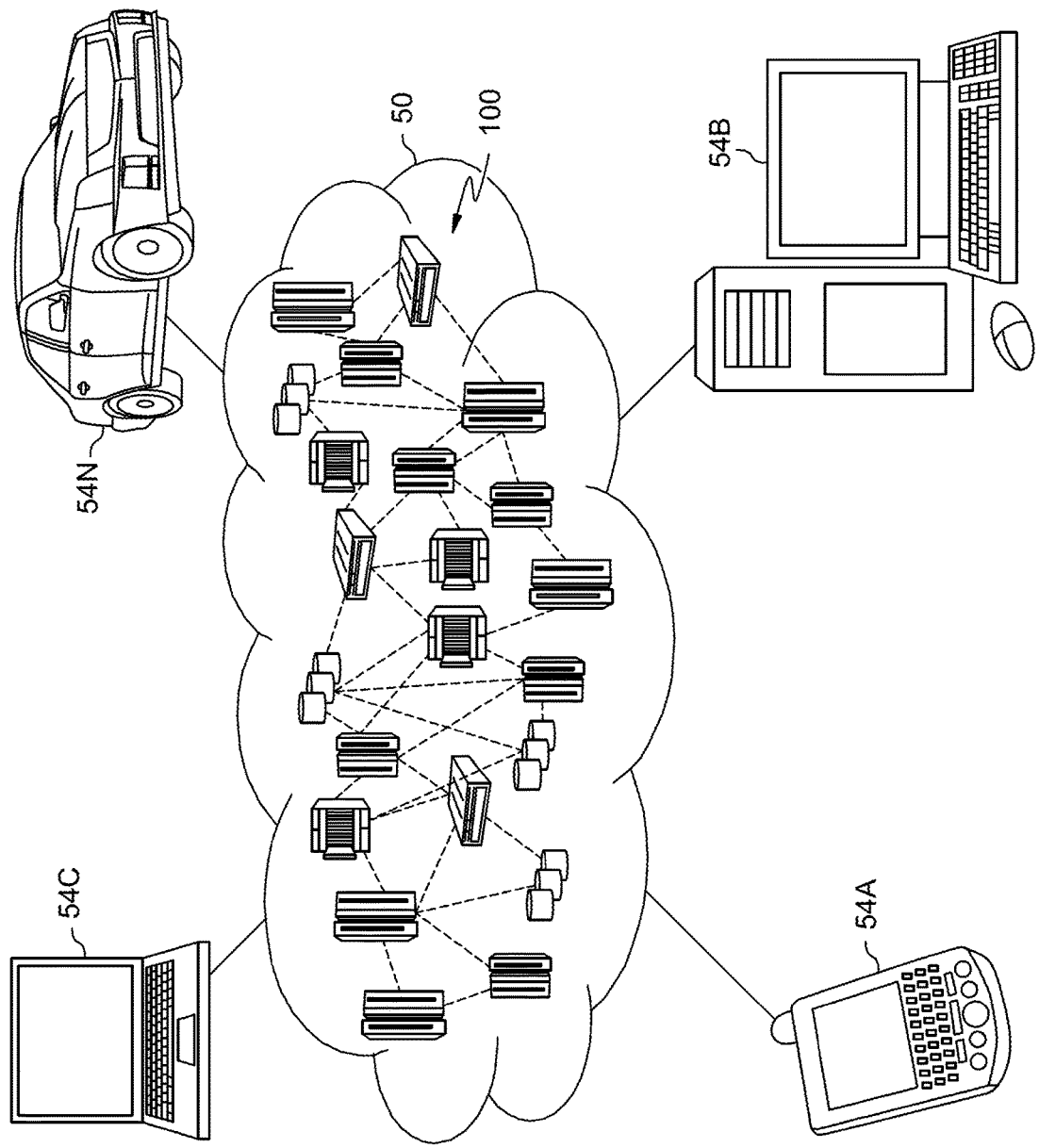
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
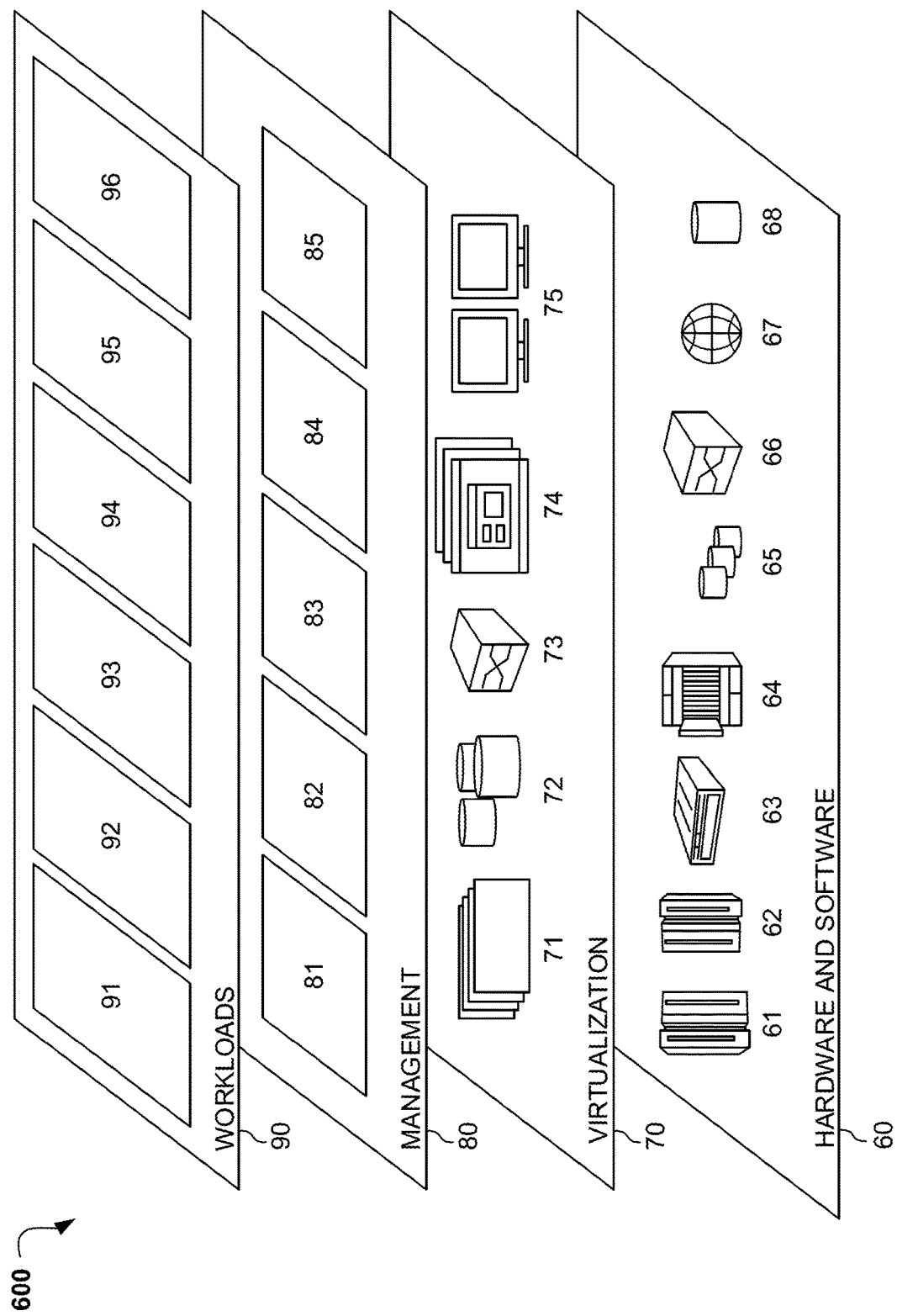
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network bandwidth conservation 96. Network bandwidth conservation 96 may relate to conserving network bandwidth in a collaborative meeting application for online video conferencing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for network bandwidth conservation, the method comprising:

tracking eye movement of a user, wherein the user is participating in a video conference with other users via a computing device;

analyzing the tracked eye movement to identify one or more focus areas of the user, wherein an identified focus area comprises a portion of a display of the computing device the user has viewed for more than a threshold amount of focus time, and wherein an identified focus area is defined by a center, based on a mapping of a gaze of the user to a point on the display, bounded by a k-distance radius from the center, and wherein the threshold amount of focus time is based on learned patterns of user eye focus which are learned via application of artificial intelligence-based methods of historical analysis on observed eye focus behavior of the user which comprises an observed average amount of time the user spends looking at another user's video feed, an observed average amount of time the user spends looking at video conference related presentations, graphics, or documents, and an observed average amount of time the user looks away from another user's video feed before returning their gaze back to the other user's video feed;

monitoring voice input of the user;

restricting ability of the user to receive images of video feeds of the other users;

in response to determining an eye focus of the user is on a video feed of another user, of the other users, within a current focus area of the user for more than the threshold amount of focus time, allowing the user to receive images of the video feed of the other user and allowing the user to receive images of respective video feeds of other users also within the current focus area, wherein the current focus area is an identified focus area which the user is currently viewing; and in response to determining that both the eye focus of the user is on a screen of the video conference and that, based on the voice input, the user is speaking towards the screen of the video conference at the same time, enabling a camera to capture real-time video of the user and transmitting the real-time video as a video feed of the user.

2. The method of claim 1, further comprising:
terminating reception of the images of the video feed of the other user in response to determining that the eye focus of the user is not on the video feed of the other user for more than a threshold amount of focus time.

3. The method of claim 1, wherein enabling the camera further comprises capturing, via the camera, one or more still images of the user.

4. The method of claim 3, further comprising:
terminating transmission of the video feed of the user in response to determining the eye focus of the user is not on a screen of a video conference; and
transmitting one or more of the still images of the user.

5. The method of claim 3, further comprising:
terminating transmission of the video feed of the user in response to determining, based on the voice input, the user is not speaking towards the screen of the video conference; and
transmitting one or more of the still images of the user.

6. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

tracking eye movement of a user, wherein the user is participating in a video conference with other users via a computing device;

analyzing the tracked eye movement to identify one or more focus areas of the user, wherein an identified focus area comprises a portion of a display of the computing device the user has viewed for more than a threshold amount of focus time, and wherein an identified focus area is defined by a center, based on a mapping of a gaze of the user to a point on the display, bounded by a k-distance radius from the center, and wherein the threshold amount of focus time is based on learned patterns of user eye focus which are learned via application of artificial intelligence-based methods of historical analysis on observed eye focus behavior of the user which comprises an observed average amount of time the user spends looking at another user's video feed, an observed average amount of time the user spends looking at video conference related presentations, graphics, or documents, and an observed average amount of time the user looks away from another user's video feed before returning their gaze back to the other user's video feed;

monitoring voice input of the user;

restricting ability of the user to receive images of video feeds of the other users;

in response to determining an eye focus of the user is on a video feed of another user, of the other users, within a current focus area of the user for more than the threshold amount of focus time, allowing the user to receive images of the video feed of the other user and allowing the user to receive images of respective video feeds of other users also within the current focus area, wherein the current focus area is an identified focus area which the user is currently viewing; and in response to determining that both the eye focus of the user is on a screen of the video conference and that, based on the voice input, the user is speaking towards the screen of the video conference at the same time, enabling a camera to capture real-time video of the user and transmitting the real-time video as a video feed of the user.

7. The computer system of claim 6, further comprising:
terminating reception of the images of the video feed of the other user in response to determining that the eye focus of the user is not on the video feed of the other user for more than a threshold amount of focus time.

8. The computer system of claim 6, wherein enabling the camera further comprises capturing, via the camera, one or more still images of the user.

9. The computer system of claim 8, further comprising:
terminating transmission of the video feed of the user in response to determining the eye focus of the user is not on a screen of a video conference; and
transmitting one or more of the still images of the user.

10. The computer system of claim 8, further comprising:
terminating transmission of the video feed of the user in response to determining, based on the voice input, the user is not speaking towards the screen of the video conference; and
transmitting one or more of the still images of the user.

11. A computer program product, the computer program product comprising:
one or more computer-readable tangible storage medium and program instructions stored on at least one of the one or more tangible storage medium, the program instructions executable by a processor capable of performing a method, the method comprising:
tracking eye movement of a user, wherein the user is participating in a video conference with other users via a computing device;
analyzing the tracked eye movement to identify one or more focus areas of the user, wherein an identified focus area comprises a portion of a display of the computing device the user has viewed for more than a threshold amount of focus time, and wherein an identified focus area is defined by a center, based on a mapping of a gaze of the user to a point on the display, bounded by a k-distance radius from the center, and wherein the threshold amount of focus time is based on learned patterns of user eye focus which are learned via application of artificial intelligence-based methods of historical analysis on observed eye focus behavior of the user which comprises an observed average amount of time the user spends looking at another user's video feed, an observed average amount of time the user spends looking at video conference related presentations, graphics, or documents, and an observed average amount of time the user looks away from another user's video feed before returning their gaze back to the other user's video feed;
monitoring voice input of the user;
restricting ability of the user to receive images of video feeds of the other users;
in response to determining an eye focus of the user is on a video feed of another user, of the other users, within a current focus area of the user for more than the threshold amount of focus time, allowing the user to receive images of the video feed of the other user and allowing the user to receive images of respective video feeds of other users also within the current focus area, wherein the current focus area is an identified focus area which the user is currently viewing; and
in response to determining that both the eye focus of the user is on a screen of the video conference and that, based on the voice input, the user is speaking towards the screen of the video conference at the same time, enabling a camera to capture real-time video of the user and transmitting the real-time video as a video feed of the user.

12. The computer program product of claim 11, further comprising:
terminating reception of the images of the video feed of the other user in response to determining that the eye focus of the user is not on the video feed of the other user for more than a threshold amount of focus time.

13. The computer program product of claim 11, wherein enabling the camera further comprises capturing, via the camera, one or more still images of the user.

14. The computer program product of claim 13, further comprising:
terminating transmission of the video feed of the user in response to determining the eye focus of the user is not on a screen of a video conference; and
transmitting one or more of the still images of the user.

15. The computer program product of claim 13, further comprising:
terminating transmission of the video feed of the user in response to determining, based on the voice input, the user is not speaking towards the screen of the video conference; and
transmitting one or more of the still images of the user.

* * * * *